US009002284B2

(12) United States Patent  
Kimura et al.

(10) Patent No.: US 9,002,284 B2  
(45) Date of Patent: *Apr. 7, 2015

(54) WIRELESS COMMUNICATION APPARATUS, WIRELESS COMMUNICATION METHOD, COMPUTER PROGRAM, AND WIRELESS COMMUNICATION SYSTEM

(71) Applicants: Ryota Kimura, Tokyo (JP); Ryo Sawai, Tokyo (JP); Yuichi Morioka, Tokyo (JP)

(72) Inventors: Ryota Kimura, Tokyo (JP); Ryo Sawai, Tokyo (JP); Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,019

(22) Filed: Nov. 7, 2013

(65) Prior Publication Data

US 2014/0057668 A1    Feb. 27, 2014

Related U.S. Application Data

(60) Continuation of application No. 13/767,608, filed on Feb. 14, 2013, now Pat. No. 8,606,185, which is a division of application No. 12/730,744, filed on Mar. 24, 2010, now Pat. No. 8,401,484.

(30) Foreign Application Priority Data

Apr. 24, 2009   (JP) ................................. 2009-106214

(51) Int. Cl.
*H04B 1/00*    (2006.01)  
*H04B 15/00*   (2006.01)  
(Continued)

(52) U.S. Cl.
CPC ............. *H04W 88/06* (2013.01); *H04B 7/0408* (2013.01); *H04B 7/0684* (2013.01); *H04B 7/26* (2013.01); *H04W 72/1257* (2013.01)

(58) Field of Classification Search
CPC ...... H04B 7/0408; H04B 7/0684; H04B 7/26; H04W 72/1257  
USPC ............. 455/63.4, 63.1, 562.1; 375/267, 699; 342/354  
See application file for complete search history.

(56) References Cited

U.S. PATENT DOCUMENTS 8,077,795 B2   12/2011   Haartsen  
8,401,484 B2   3/2013    Kimura et al.  
(Continued)

FOREIGN PATENT DOCUMENTS

CN   200580030585   10/2007  
JP   11-068753      3/1999  
(Continued)

*Primary Examiner* — Lewis West  
(74) *Attorney, Agent, or Firm* — Finnegan Henderson Farabow Garrett & Dunner LLP

(57) ABSTRACT

A wireless communication apparatus includes: a first wireless communication section performing wireless communication on the basis of a first communication mode; a second wireless communication section performing wireless communication on the basis of a second communication mode using a different frequency band from the first communication mode; a beam learning signal generation section generating a beam learning signal for specifying a beam pattern at the time of the communication based on the second communication mode and transmitting the beam learning signal from the second wireless communication section; a response information acquisition section acquiring response information responding to the transmitted beam learning signal; and a preliminary information generation section generating preliminary information so as not to cause interference among a plurality of wireless communications using the second communication mode on the basis of the response information and transmitting the preliminary information from the first wireless communication section.

14 Claims, 16 Drawing Sheets

(51) Int. Cl.
*H04W 88/06* (2009.01)
*H04B 7/04* (2006.01)
*H04B 7/06* (2006.01)
*H04B 7/26* (2006.01)
*H04W 72/12* (2009.01)

(56) References Cited

U.S. PATENT DOCUMENTS

| | | |
|---|---|---|
| 2002/0027894 A1 | 3/2002 | Arrakoski |
| 2005/0064909 A1 | 3/2005 | Kim |
| 2006/0056345 A1 | 3/2006 | Marinier |
| 2006/0246953 A1 | 11/2006 | Yamamoto |
| 2007/0076813 A1 | 4/2007 | Haartsen |
| 2008/0182574 A1 | 7/2008 | Haartsen |
| 2010/0184391 A1 | 7/2010 | Razzell |
| 2010/0210221 A1 | 8/2010 | Takano |
| 2010/0271991 A1 | 10/2010 | Kimura |
| 2010/0273428 A1 | 10/2010 | Kimura |
| 2011/0033000 A1 | 2/2011 | Berens |
| 2011/0279319 A1 | 11/2011 | Takano |

FOREIGN PATENT DOCUMENTS

| | | |
|---|---|---|
| JP | 2000-307494 | 11/2000 |
| JP | 3-333117 | 7/2002 |
| JP | 3-544891 | 4/2004 |

FIG. 12

|  | 20 | 30-1 | 30-2 | 30-3 | 30-4 |
|---|---|---|---|---|---|
| 20 |  | ○ | ○ | ○ | ○ |
| 30-1 | ○ |  | ○ | × | × |
| 30-2 | ○ | ○ |  | × | × |
| 30-3 | ○ | × | × |  | ○ |
| 30-4 | ○ | × | × | ○ |  |

WIRELESS COMMUNICATION APPARATUS, WIRELESS COMMUNICATION METHOD, COMPUTER PROGRAM, AND WIRELESS COMMUNICATION SYSTEM

This is a continuation of application Ser. No. 13/767,608, filed Feb. 14, 2013, which is a division of application Ser. No. 12/730,744, filed Mar. 24, 2010, and claims priority to Japan Patent Application No. JP 2009-106214, filed Apr. 24, 2009, all of which are incorporated herein by reference.

BACKGROUND OF THE INVENTION

1. Field of the Invention

The present invention relates to a wireless communication apparatus, a wireless communication method, a computer program, and a wireless communication system. Specifically, for example, the invention relates to a wireless communication apparatus, which performs communication using a millimeter wave by directing the beam of the directional antenna to the direction of the communication target location, a wireless communication method therefor, a computer program therefor, and a wireless communication system using the same.

2. Description of the Related Art

In wireless communication, there have been developments in technologies of millimeter-wave communication for promoting utility, such as large-volume and long-distance transmission, a decrease in size of wireless equipment, and reduction in cost, and which have been mainly used for short distance wireless access communication, image transmission systems, simple wireless communication, anti-collision radars for vehicles, and the like. The wavelength of the millimeter wave is in the range of 1 mm to 10 mm, which corresponds to 30 GHz to 300 GHz in terms of frequency. For example, in the wireless communication using a 60 GHz band, it is possible to allocate a channel in units of GHz, and it is also possible to perform high-speed data communication.

The millimeter wave has a short wavelength and excellent straightness, and enables transmission of very large volume of information, as compared with the microwave having come into widespread use in the wireless LAN (Local Area Network) technology. In contrast, since the millimeter wave is rapidly attenuated in accordance with reflection, the direct wave thereof or the just one-time reflected wave is mainly used as a path of the wireless communication. In addition, since the millimeter wave has a large propagation loss, the millimeter wave has a property that the wireless signal does not reach far.

To complement the problem in the reach distance of the millimeter wave, a method is conceivable in which directivity is provided to the antenna of the transceiver and the communication distance is increased by directing the transmission beam and reception beam of the antenna to the direction of the communication target location. The directivity of the beam can be controlled, for example, in a way that a plurality of antennas are respectively provided to the transceivers and the weighting of transmission or the weighting of reception is changed for each antenna. In the millimeter wave, the reflected wave is scarcely used, and thus the direct wave becomes important. From this point, it is conceivable to use a directional beam which is pointed. In addition, the optimal directivity of the antenna is learned, and then the millimeter-wave wireless communication may be performed.

In the millimeter-wave communication, for example, the direction of the transmission antenna is determined by transmitting a signal for determining the direction of the directivity of the transmission antenna by using the second communication unit using the communication based on any one of electric line communication, optical communication, and sound wave communication. Further, there have been proposed wireless transmission systems for performing wireless transmission between the transceivers by using the first communication unit using the electric wave of 10 GHz or more after the determination of the direction of the antenna (for example, refer to Japanese Patent Nos. 3544891 and 3333117).

Further, the method of increasing the communication distance by using the directivity of the antenna is also applied to the IEEE802.15.3c which is the standard of the wireless PAN (mmWPAN: millimeter-wave Wireless Personal Area Network) using the millimeter wave band.

SUMMARY OF THE INVENTION

By the way, even in the wireless communication system configured to provide the directivity to the antenna of the transceiver and perform communication by directing the transmission beam and reception beam to the direction of the communication target location, there is an unnecessary process such as retransmission performed when interference occurs in the system during the wireless communication. Accordingly, information (hereinafter, referred to as "preliminary information") representing the transmission/reception schedule and the like is provided in advance to the wireless communication apparatus before the communication, and then wireless communication is performed on the basis of the preliminary information, thereby enabling efficient communication without causing retransmission. However, unless the wireless communication of the preliminary information has high reliability, it is difficult to perform efficient wireless communication without generating an unnecessary process.

Accordingly, in the embodiments of the invention, it is desirable to provide a wireless communication apparatus capable of performing efficient wireless communication by performing reliable communication on the preliminary information. In addition, it is also desirable to provide a wireless communication method therefor, a computer program therefor, and a wireless communication system using the same.

According to the first embodiment of the invention, a wireless communication apparatus includes: a first wireless communication section performing wireless communication on the basis of a first communication mode; a second wireless communication section performing wireless communication on the basis of a second communication mode using a different frequency band from the first communication mode; a beam learning signal generation section generating a beam learning signal for specifying a beam pattern at the time of the communication based on the second communication mode and transmitting the beam learning signal from the second wireless communication section; a response information acquisition section acquiring response information responding to the transmitted beam learning signal; and a preliminary information generation section generating preliminary information so as not to cause interference among a plurality of wireless communications using the second communication mode on the basis of the response information and transmitting the preliminary information from the first wireless communication section.

In the embodiment of the invention, for example, the wireless communication is performed in the first communication mode of a frequency channel less than 10 GHz and in the second communication mode of a frequency channel equal to or more than 10 GHz. Further, the beam learning signal enabling identification as to which beam pattern is used in the transmission thereof is generated, and the beam learning signal is transmitted with the beam pattern based on the beam learning signal in the second communication mode. Then, on the basis of the response information responding to the beam learning signal, the communication schedule is set so that the plurality of wireless communications are performed at the same time in the second communication mode. Thus, the preliminary information including the communication schedule is simultaneously or separately transmitted to the plurality of wireless communication apparatuses in the first communication mode.

According to a second embodiment of the invention, a wireless communication apparatus includes: a first wireless communication section performing wireless communication on the basis of a first communication mode; a second wireless communication section performing wireless communication on the basis of a second communication mode using a different frequency band from the first communication mode; a reception situation monitoring section receiving a beam learning signal transmitted in the second communication mode in order to specify a beam pattern at the time of the communication based on the second communication mode, and monitoring a reception situation for each beam pattern; and a response information generation section generating and transmitting response information on the basis of the monitoring result of the reception situation.

In the embodiment of the invention, when the beam learning signal transmitted in the second communication mode is received, the reception situation is monitored for each beam pattern. Thereby, the response information including information enabling identification as to the beam pattern by which the reception situation is optimized is generated and transmitted. Further, the response information includes information representing the available wireless communication apparatus. In addition, the beam learning signal for specifying the beam pattern at the time of the communication based on the second communication mode is generated, and transmitted together with the response information in the second communication mode.

According to a third embodiment of the invention, a wireless communication method includes the steps of: performing wireless communication on the basis of a first communication mode, by using a first wireless communication section; performing wireless communication on the basis of a second communication mode using a different frequency band from the first communication mode, by using a second wireless communication section; generating a beam learning signal for specifying a beam pattern at the time of the communication based on the second communication mode and transmitting the beam learning signal from the second wireless communication section, by using a beam learning signal generation section; acquiring response information responding to the transmitted beam learning signal, by using a response information acquisition section; and generating preliminary information so as not to cause interference among a plurality of wireless communications using the second communication mode on the basis of the response information and transmitting the preliminary information from the first wireless communication section, by using a preliminary information generation section.

According to the fourth embodiment of the invention, a wireless communication method includes the steps of: performing wireless communication on the basis of a first communication mode, by using a first wireless communication section; performing wireless communication on the basis of a second communication mode using a different frequency band from the first communication mode, by using a second wireless communication section; receiving a beam learning signal transmitted in the second communication mode in order to specify a beam pattern at the time of the communication based on the second communication mode, and monitoring a reception situation for each beam pattern, by using a reception situation monitoring section; and generating and transmitting response information on the basis of the monitoring result of the reception situation, by using a response information generation section.

According to a fifth embodiment of the invention, a computer program causes a computer to execute a communication process in a communication apparatus including a first wireless communication section performing wireless communication on the basis of a first communication mode and a second wireless communication section performing wireless communication on the basis of a second communication mode using a different frequency band from the first communication mode. The computer program causes the computer to function as: means for performing wireless communication on the basis of the first communication mode by using the first wireless communication section; means for performing wireless communication on the basis of the second communication mode using a different frequency band from the first communication mode by using the second wireless communication section; means for generating a beam learning signal for specifying a beam pattern at the time of the communication based on the second communication mode and transmitting the beam learning signal from the second wireless communication section; means for acquiring response information responding to the transmitted beam learning signal; and means for generating preliminary information so as not to cause interference among a plurality of wireless communications using the second communication mode on the basis of the response information and transmitting the preliminary information from the first wireless communication section.

According to a sixth embodiment of the invention, a computer program causes a computer to execute a communication process in a communication apparatus including a first wireless communication section performing wireless communication on the basis of a first communication mode and a second wireless communication section performing wireless communication on the basis of a second communication mode using a different frequency band from the first communication mode. The computer program causes the computer to function as: means for performing wireless communication on the basis of the first communication mode by using the first wireless communication section; means for performing wireless communication on the basis of the second communication mode using a different frequency band from the first communication mode by using the second wireless communication section; means for receiving a beam learning signal transmitted in the second communication mode in order to specify a beam pattern at the time of the communication based on the second communication mode, and monitoring a reception situation for each beam pattern; and means for generating and transmitting response information on the basis of the monitoring result of the reception situation.

According to a seventh embodiment of the invention, a communication system includes a plurality of wireless communication apparatuses that perform communication on the basis of a first communication mode and a second communication mode using a different frequency band from the first communication mode. The plurality of wireless communications apparatus includes a first wireless communication apparatus and a second wireless communication apparatus. The first wireless communication apparatus includes a first wireless communication section performing wireless communication on the basis of the first communication mode, a second wireless communication section performing wireless communication on the basis of the second communication mode, a beam learning signal generation section generating a beam learning signal for specifying a beam pattern at the time of the communication based on the second communication mode and transmitting the beam learning signal from the second wireless communication section, a response information acquisition section acquiring response information responding to the transmitted beam learning signal, and a preliminary information generation section generating preliminary information so as not to cause interference among a plurality of wireless communications using the second communication mode on the basis of the response information and transmitting the preliminary information from the first wireless communication section. The second wireless communication apparatus includes a first wireless communication section performing wireless communication on the basis of the first communication mode, a second wireless communication section performing wireless communication on the basis of the second communication mode, a reception situation monitoring section receiving a beam learning signal transmitted in the second communication mode in order to specify a beam pattern at the time of the communication based on the second communication mode, and monitoring a reception situation for each beam pattern, and a response information generation section generating and transmitting response information on the basis of the monitoring result of the reception situation.

Furthermore, the computer program according to the embodiment of the invention is a computer program that can be provided to a general computer system capable of executing, for example, various program codes through computer-readable storage media and communication media. For example, the storage media includes optical discs, magnetic discs, semiconductor memories, and the like, and the communication media includes networks and the like. By providing such a computer-readable program, processing based on the program is executed in the computer system.

According to the embodiment of the invention, by performing wireless communication on the basis of the first communication mode and the second communication mode using the different frequency band from the first communication mode, the beam learning signal for specifying the beam pattern at the time of the communication based on the second communication mode is transmitted in the second communication mode. As described later, it is preferable that the frequency band of the first communication mode should be lower than that of the second communication mode. On the basis of the response information responding to the transmitted beam learning signal, the preliminary information is generated so as not to cause interference among the plurality of wireless communications using the second communication mode, and thus the preliminary information is transmitted from the first wireless communication section. Further, in the wireless communication apparatus receiving the beam learning signal transmitted in the second communication mode, the reception situation is monitored for each beam pattern, and the response information is generated and transmitted on the basis of the monitoring result of the reception situation.

Hence, by optimally setting the beam pattern on the basis of the beam learning signal and the response information, it is possible to perform communication in the second communication mode. Further, on the basis of the response information, the preliminary information is generated so as not to cause interference among the plurality of wireless communications using the second communication mode, and thus the preliminary information is transmitted, for example, in the first communication mode which has a lower frequency band than the second communication mode. Therefore, it is possible to perform communication of the preliminary information with high reliability as compared with the case of using the second communication mode. In addition, the preliminary information is generated so as not to cause interference among the plurality of wireless communications. Therefore, on the basis of the preliminary information, it is possible to perform efficient wireless communication without causing interference even when the plurality of wireless communications is performed in the second communication mode.

BRIEF DESCRIPTION OF THE DRAWINGS

FIG. 12 is a diagram illustrating an example of a schedule table;

DESCRIPTION OF THE PREFERRED EMBODIMENTS

Figure 1:
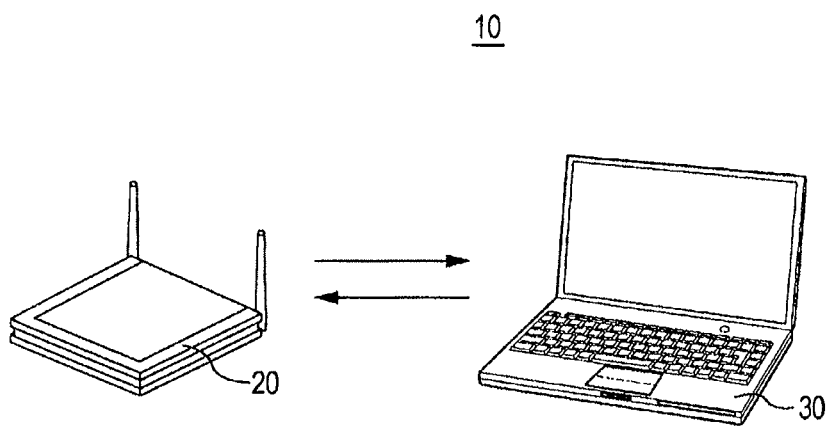
FIG. 1 is a diagram illustrating an exemplary configuration of a wireless communication system.

Hereinafter, preferred embodiments will be described. The wireless communication system using the millimeter wave forms a pointed antenna directivity (that is, beam-shaped antenna directivity) by using a plurality of transmission/reception antennas, and thus it is possible to enlarge the communication range. However, it is possible to increase the communication distance by directing the beam to the direction of the communication target location, but it is difficult to synchronize packets in a step of not directing the beam. For example, at the time of new entry to a network or at the time of change in location relative to the communication target caused by movement of a terminal and the like, it is difficult to synchronize packets. Hence, it is difficult even to detect arrival of packets.

Accordingly, in a wireless communication system according to an embodiment of the invention, directivity is changed for each one packet and the packets are transmitted in the second communication mode from the transmission side in order to select an optimal beam pattern, by the combined use of the first communication mode and the second wireless mode using a different frequency band from the first communication mode. The reception side estimates that the transmission side employs a beam pattern with a desirable directivity when the reception side is able to receive packets. Further, the first communication mode is used before the wireless communication is performed by using the beam pattern with the desirable directivity, thereby performing communication of preliminary information with high reliability. Furthermore, the preliminary information is generated so as not to cause interference among the plurality of wireless communications using the second communication mode.

The first communication mode uses, for example, the microwave (5 GHz band and the like) which is prescribed by IEEE802.11a/b/g having come into widespread use as a wireless LAN standard. Further, the second communication mode uses a frequency band higher than that of the first communication mode, for example, the millimeter wave (60 GHz band) prescribed by the VHT (Very High Throughput) standard.

The first communication mode using the microwave is disadvantageous in straightness, and attenuation at the time of reflection is small, as compared with the mode using the millimeter wave. Therefore, it is possible to perform the communication of the preliminary information with high reliability. Further, since the second communication mode uses the millimeter wave, the straightness is excellent, and the attenuation at the time of reflection is large. Hence, it is possible to perform wireless communication at a high transmission rate by directing the transmission beam and reception beam toward the communication target. In addition, by performing wireless communication on the basis of the preliminary information, it is possible to perform the plurality of wireless communications without causing interference in the second communication mode. Therefore, it is possible to perform efficient wireless communication. Furthermore, the first and second communication modes are not limited to the specific frequency band like 5 GHz band or 60 GHz band. The description will be given in the following order.

1. First Embodiment (two wireless communication apparatuses are used)
2. Second Embodiment (three or more wireless communication apparatuses are used)

1. First Embodiment

Configuration of Wireless Communication System

FIG. 1 shows an exemplary configuration of a wireless communication system. The wireless communication system 10 includes a wireless communication apparatus 20 and a wireless communication apparatus 30.

The wireless communication apparatuses 20 and 30 are configured to perform wireless communication to each other by using both the first communication mode and the second communication mode mentioned above. The first communication mode using the microwave is disadvantageous in straightness, and attenuation at the time of reflection is small, as compared with the mode using the millimeter wave. Accordingly, when the wireless communication apparatuses 20 and 30 performs the wireless communication on the basis of the first communication mode, the apparatuses are able to communicate with each other without considering the directivity of the transmission beam and the reception beam. On the other hand, since the second communication mode uses millimeter wave, the straightness is excellent, and the attenuation at the time of reflection is large. When the wireless communication apparatuses 20 and 30 performs the wireless communication on the basis of the second communication mode, it is more preferable to transmit and receive wireless signals by directing the transmission beam and the reception beam toward each communication target.

Figure 2:
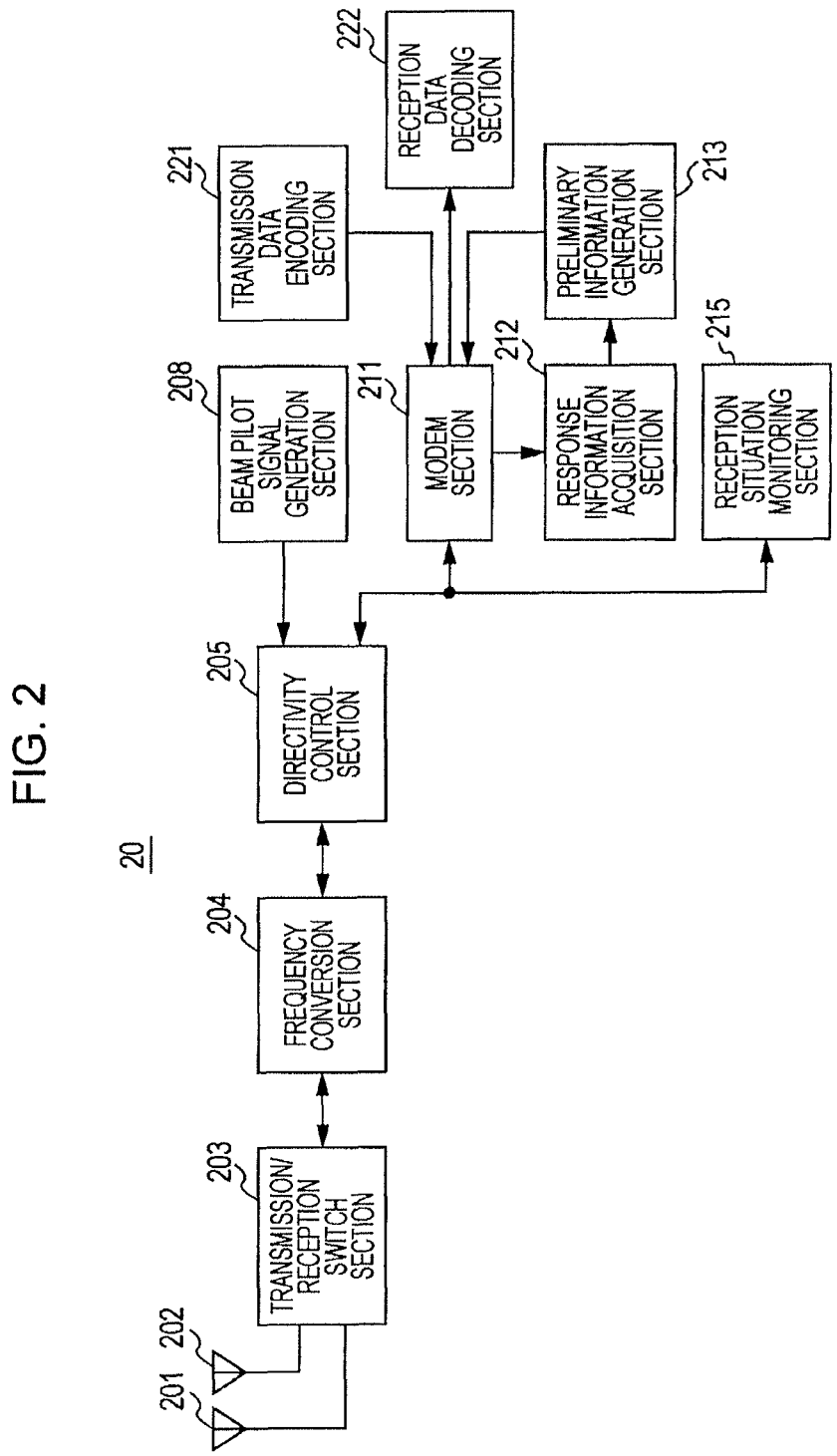
FIG. 2 is a diagram illustrating an exemplary configuration of a wireless communication apparatus.

FIG. 2 shows an exemplary configuration of the wireless communication apparatus 20. The wireless communication apparatus 20 may be operated as a broadband router or a wireless access point.

The wireless communication apparatus 20 includes antennas 201 and 202, a transmission/reception switch section 203, a frequency conversion section 204, a directivity control section 205, a beam learning signal generation section 208, a modem section 211, a response information acquisition section 212, and a preliminary information generation section 213. Further, the wireless communication apparatus 20 includes a reception situation monitoring section 215, a transmission data encoding section 221, and a reception data decoding section 222.

The antenna 201 is an antenna used when the wireless communication is performed in the first communication mode. The antenna 201 transmits the preliminary information, which is for performing the communication based on the second communication mode by using the antenna 202, on the basis of the first communication mode. Further, the antenna 201 receives the signal transmitted in the first communication mode.

The antenna 202 is an antenna used when the wireless communication is performed in the second communication mode. The antenna 202 is configured so that the directivity can be changed by the directivity control section 205 to be described later. For example, the antenna 202 is configured to include a plurality of antennas, and the antenna used in transmission/reception is changed or the weighting of the signal is adjusted, thereby changing the directivity. Further, a sector is changed by using a sector switching antenna as the antenna 202, and thereby the directivity may be changed. The antenna 202 transmits a beam learning signal for learning an appropriate beam pattern or data signal transmitted at a high transmission rate on the basis of the second communication mode. Further, the antenna 202 receives information data transmitted in the second communication mode.

The transmission/reception switch section 203 provides the transmission signal of the first communication mode provided from the frequency conversion section 204 to the antenna 201, and provides the transmission signal of the second communication mode to the antenna 202. Further, the transmission/reception switch section 203 provides the reception signal of the first communication mode obtained by the antenna 201 and the reception signal of the second communication mode obtained by the antenna 202 to the frequency conversion section 204.

The frequency conversion section 204 converts the transmission signal, which is provided from the directivity control section 205, into a signal with a wireless frequency corresponding to the first communication mode or second communication mode, and outputs the signal to the transmission/reception switch section 203. Further, the frequency conversion section 204 converts the wireless frequency signal, which is provided from the transmission/reception switch section 203, into an intermediate frequency signal, and outputs the signal to the directivity control section 205.

The directivity control section 205 changes the beam pattern of the antenna 202. Further, when the optimal beam pattern of the antenna 202 in the transmission of the wireless signal is discriminated, the directivity control section 205 outputs the beam learning signal, which is provided from the beam learning signal generation section 208 to be described later, to the frequency conversion section 204. Furthermore, the beam learning signal is a signal transmitted when the optimal beam pattern is estimated.

The directivity control section 205 performs processing on the beam learning signal so as to enable identification as to which beam pattern of the antenna 202 the beam learning signal is transmitted with. For example, the directivity control section 205 adds a pattern identifier, which corresponds to the beam pattern of the antenna 202, to the beam learning signal. Further, for example, the directivity control section 205 may change a beam learning signal sequence in response to the beam pattern of the antenna 202. By performing such processing, the wireless communication apparatus receiving the beam learning signal is able to discriminate the beam pattern of the antenna 202 in the transmission-side wireless communication apparatus from the pattern identifier or the beam learning signal sequence of the reception signal. Furthermore, the beam learning signal generation section 208 may generate the beam learning signal so as to enable identification as to which beam pattern is used in the transmission.

Further, the directivity control section 205 outputs the reception signal, which is provided from the frequency conversion section 204, to the modem section 211. Further, when the optimal beam pattern of the antenna 202 in the reception of the wireless signal is discriminated, the directivity control section 205 outputs the reception signal, which is provided from the frequency conversion section 204, and the information, which represents the beam pattern of the antenna 202, to the reception situation monitoring section 215.

The beam learning signal generation section 208 generates the beam learning signal and outputs the signal to the directivity control section 205 when the optimal beam pattern of the antenna 202 is estimated.

The modem section 211 performs a demodulation process on the signal which is received by the antennas 201 and 202. Further, the modem section 211 performs a modulation process on the signal which transmitted from the antennas 201 and 202. The modem section 211 demodulates the signal, which is received by the antenna 201, in the demodulation mode used in the first communication mode, and demodulates the signal, which is received by the antenna 202, in the demodulation mode used in the second communication mode. When the beam pattern is being estimated, the modem section 211 outputs the demodulated reception signal to the response information acquisition section 212. After the estimation of the beam pattern is completed, the modem section 211 outputs the demodulated reception signal to the reception data decoding section 222.

Further, the modem section 211 modulates the preliminary information, which is provided from the preliminary information generation section 213, on the basis of the modulation mode used in the first communication mode, and outputs the information to the directivity control section 205. Then, the modem section 211 modulates the transmission data, which is provided from the transmission data encoding section 221, on the basis of the modulation mode used in the second communication mode, and outputs the data to the directivity control section 205.

The response information acquisition section 212 decodes the signal provided from the modem section 211, and acquires the response information from the wireless communication apparatus receiving the beam learning signal. Further, the response information acquisition section 212 provides the acquired response information to the preliminary information generation section 213.

The response information is, as described later, information which is generated on the basis of the monitoring result of the reception situation monitored in the reception situation monitoring section 315 of the wireless communication apparatus 30, and includes information enabling identification of the beam pattern by which the reception situation is optimized.

The preliminary information generation section 213 generates the preliminary information on the basis of the response information which is notified from the response information acquisition section 212. The preliminary information is information for performing the plurality of wireless communications using the second communication mode without causing interference. The preliminary information represents scheduled transmission/reception timing of the wireless communication apparatus, electric power of the scheduled transmission of the wireless communication apparatus, a modulation mode or an encoding mode in the scheduled transmission of the wireless communication apparatus, a transmission/reception directivity beam pattern, and the like.

The reception situation monitoring section 215 monitors the reception signal on the basis of the signal which is provided through the directivity control section 205. The reception situation monitoring section 215 discriminates the beam pattern having the best reception characteristics at the time of the reception from a received power of the reception signal for each beam pattern, a signal-to-noise ratio, and the like. For example, the antenna 202 is configured to include a plurality of antennas, and the weighting of the signal, which is received by the directivity control section 205, is adjusted, thereby generating the reception signal for each beam pattern. The reception situation monitoring section 215 selects the signal, of which the received power is largest and the signal-to-noise ratio and the like are favorable, from the reception signal for each beam pattern. Then, the reception situation monitoring section 215 sets the beam pattern, which corresponds to the selected reception signal, as the beam pattern at the time of the reception in the communication with the wireless communication apparatus which transmits the response information.

The transmission data encoding section 221 encodes the transmission data transmitted in the second communication mode, that is, the data signal transmitted at a high transmission rate by using the encoding mode which is represented by the preliminary information, and outputs the same to the modem section 211. Further, the reception data decoding section 222 decodes the reception data, which is provided from the modem section 211, by using the encoding mode which is represented by the preliminary information.

Figure 3:
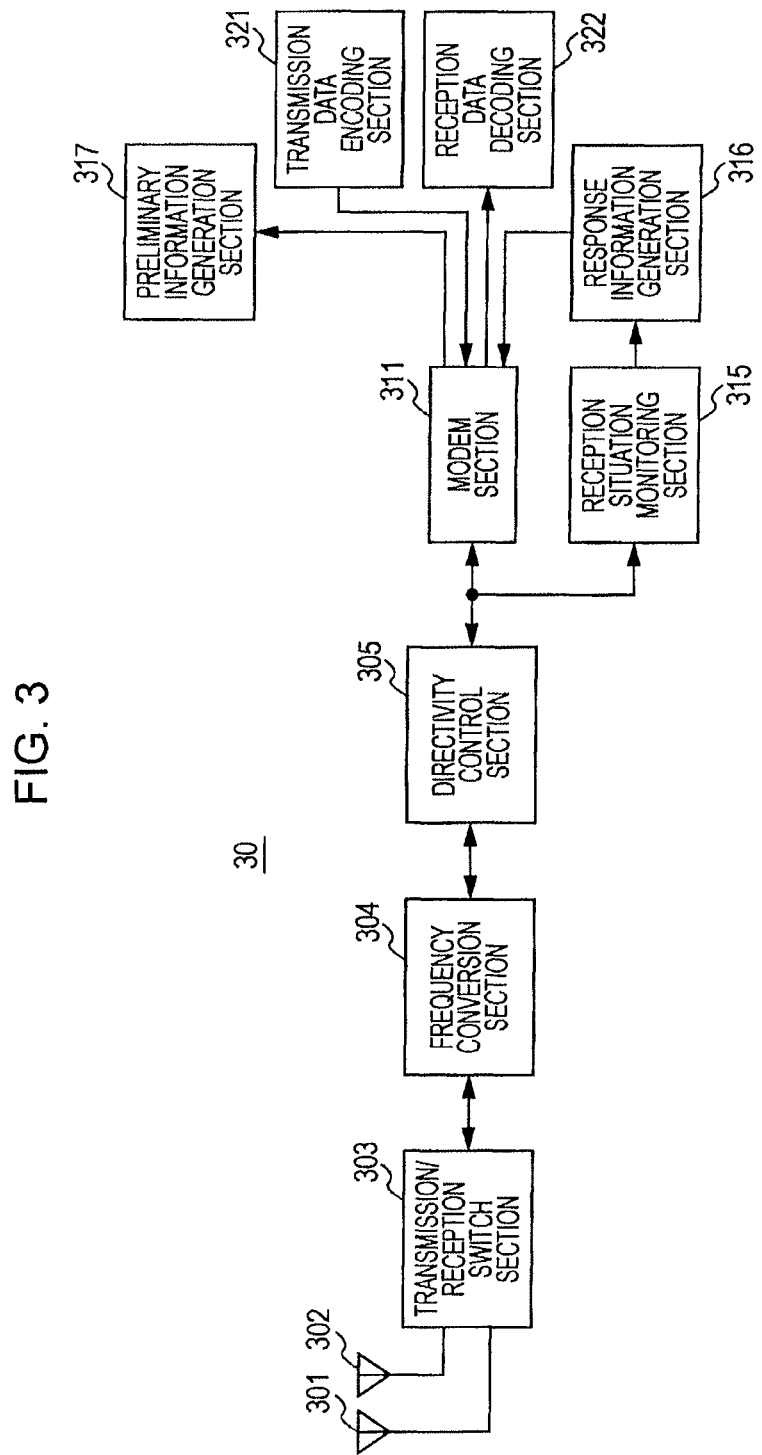
FIG. 3 is a diagram illustrating an exemplary configuration of a wireless communication apparatus.

FIG. 3 shows an exemplary configuration of the wireless communication apparatus 30. The wireless communication apparatus 30 includes an antennas 301 and 302, a transmission/reception switch section 303, a frequency conversion section 304, a directivity control section 305, a modem section 311, a reception situation monitoring section 315, a response information generation section 316, and a preliminary information acquisition section 317. Further, the wireless communication apparatus 30 includes a transmission data encoding section 321 and a reception data decoding section 322.

The antenna 301 is an antenna used when the wireless communication is performed in the first communication mode. The antenna 301 receives the preliminary information transmitted in the first communication mode.

The antenna 302 is an antenna used when the wireless communication is performed in the second communication mode. The antenna 302 is configured so that the directivity can be changed by the directivity control section to be described later. For example, the antenna 302 is configured to include a plurality of antennas, and the antenna used in transmission/reception is changed or the weighting of the signal is adjusted, thereby changing the directivity. Further, a sector is changed by using a sector switching antenna as the antenna 302, and thereby the directivity may be changed. The antenna 302 receives the beam learning signal and the data transmitted in the second communication mode. Further, the antenna 302 transmits the data signal, which is transmitted at a high transmission rate, in the second communication mode.

In addition, the antenna 301 or the antenna 302 transmits the response information in order to perform communication in the second communication mode. For example, when the response information is transmitted from the antenna 301, the information is transmitted in the first communication mode. In addition, when the response information is transmitted from the antenna 302, the information is transmitted in the second communication mode.

The transmission/reception switch section 303 provides the transmission signal of the first communication mode provided from the frequency conversion section 304 to the antenna 301, and provides the transmission signal of the second communication mode to the antenna 302. Further, the transmission/reception switch section 303 provides the reception signal of the first communication mode obtained by the antenna 301 and the reception signal of the second communication mode obtained by the antenna 302 to the frequency conversion section 304.

The frequency conversion section 304 converts the transmission signal, which is provided from the directivity control section 305, into a signal with a wireless frequency corresponding to the first communication mode or second communication mode, and outputs the signal to the transmission/reception switch section 303. Further, the frequency conversion section 304 converts the wireless frequency signal, which is provided from the transmission/reception switch section 303, into an intermediate frequency signal, and outputs the signal to the directivity control section 305.

The directivity control section 305 changes the beam pattern of the antenna 302. Further, the directivity control section 305 outputs the intermediate frequency signal, which is provided from the frequency conversion section 304, to the modem section 311. Further, when the optimal beam pattern of the antenna 302 in the reception of the wireless signal is discriminated, the directivity control section 305 outputs the intermediate frequency signal, which is provided from the frequency conversion section 304, and the information, which represents the beam pattern of the antenna 302, to the reception situation monitoring section 315.

The modem section 311 performs a demodulation process on the signal which is received by the antennas 301 and 302. Further, the modem section 311 performs a modulation process on the signal which transmitted from the antennas 301 and 302. The modem section 311 demodulates the signal, which is received by the antenna 301, in the demodulation mode used in the first communication mode, and demodulates the signal, which is received by the antenna 302, in the demodulation mode used in the second communication mode. When the beam pattern is being estimated, the modem section 311 modulates the response information, which is generated by the response information generation section 316 to be described later, on the basis of the modulation mode used in the first or second communication mode, and outputs the information to the directivity control section 305. For example, when the response information is transmitted from the antenna 301, the modem section 311 modulates the response information on the basis of the modulation mode used in the first communication mode. In addition, when the response information is transmitted from the antenna 302, the modem section 311 modulates the response information on the basis of the modulation mode used in the second communication mode. After the estimation of the beam pattern is completed, the modem section 311 outputs the demodulated reception signal to the reception data decoding section 322. Further, the modem section 311 modulates the transmission data, which is provided from the transmission data encoding section 321, on the basis of the modulation mode used in the second communication mode, and outputs the data to the directivity control section 305.

The reception situation monitoring section 315 monitors the reception signal on the basis of the signal which is provided through the directivity control section 305. The reception situation monitoring section 315 measures a received power of the reception signal for each beam pattern, a signal-to-noise ratio, and the like. The reception situation monitoring section 315 may discriminate the beam pattern having the best reception characteristics at the time of the reception from a received power of the reception signal for each beam pattern, a signal-to-noise ratio, and the like. For example, the antenna 302 is configured to include a plurality of antennas, and the weighting of the signal, which is received by the directivity control section 305, is adjusted, thereby generating the reception signal for each beam pattern. The reception situation monitoring section 315 selects the signal, of which the received power is largest and the signal-to-noise ratio and the like are favorable, from the reception signal for each beam pattern. Then, the reception situation monitoring section 315 sets the beam pattern, which corresponds to the selected reception signal, as the beam pattern at the time of the reception in the communication with the wireless communication apparatus which transmits the response information.

Further, when the beam learning signal is received with the beam pattern at the time of the reception, the reception situation monitoring section 315 provides the monitoring result of the received power and the signal-to-noise ratio, the beam learning signal sequence and the pattern identifier obtained when the reception situation is most favorable to the response information generation section 316.

The response information generation section 316 generates the response information on the basis of the monitoring result of the reception situation which is monitored by the reception situation monitoring section 315. The response information includes information enabling identification of the beam pattern by which the reception situation is optimized. For example, the response information may represent a part of or all of the received power for each beam pattern. Further, the response information may include the signal-to-noise ratio of the part of or all of the signal monitored by the reception situation monitoring section, the pattern identifier of a part of or all of the beam pattern obtained when the reception situation monitored by the reception situation monitoring section is favorable, the beam learning signal sequence, and the like. Further, the response information may include information representing that communication is not available with any beam pattern. Furthermore, the response information is not limited to those, and it may be possible to notify different information if the information enables identification of the beam pattern by which the reception situation is optimized.

The preliminary information acquisition section 317 decodes the signal which is provided from the modem section 211, and acquires the preliminary information which is transmitted from the wireless communication apparatus 20. Further, on the basis of the preliminary information, the preliminary information acquisition section 317 configures the settings for the transmission/reception timing, the transmitted power, the modulation mode and the encoding mode in the transmission, the transmission/reception directivity beam pattern, and the like.

The transmission data encoding section 321 encodes the transmission data transmitted in the second communication mode, that is, the data signal transmitted at a high transmission rate by using the encoding mode which is represented by the preliminary information, and outputs the same to the modem section 311. Further, the reception data decoding section 322 decodes the reception data, which is provided from the modem section 311, by using the encoding mode which is represented by the preliminary information.

Furthermore, the first wireless communication section, which performs wireless communication in the first communication mode, includes the antennas 201 and 301, the transmission/reception switch sections 203 and 303, the frequency conversion sections 204 and 304, and the like. Further, the second wireless communication section, which performs wireless the antennas 202 and 302 in the second communication mode, includes the transmission/reception switch sections 203 and 303, the frequency conversion sections 204 and 304, the directivity control sections 205 and 305, and the like.

In addition, the configurations of the wireless communication apparatuses 20 and 30 are not limited to the configurations shown in FIGS. 2 and 3. For example, it may be possible to adopt a configuration in which the wireless communication apparatuses 20 and 30 is provided with the beam learning signal generation section, the response information acquisition section, and the response information generation section so that any one of the wireless communication apparatuses 20 and 30 is able to transmit the beam learning signal and the response information. Further, each of the wireless communication apparatuses 20 and 30 may be provided with the preliminary information generation section and the preliminary information acquisition section so that the configurations of those are made to be common. In this case, when the wireless communication apparatus 20 manages the communication, the preliminary information generation section of the wireless communication apparatus 20 and the preliminary information acquisition section of the wireless communication apparatus 30 are operated.

Next, the operation of the wireless communication system 10 is described. The wireless communication system 10 performs the transmission of the data signals between the wireless communication apparatus 20 and the wireless communication apparatus 30. In this case, the wireless communication system 10 performs a training process for setting the beam pattern of the antenna used in the second communication mode to be an optimal state and the communication process of the preliminary information before the communication of the data signal.

In the training process, the wireless communication apparatus 20 generates the beam learning signal for specifying the beam pattern at the time of the communication based on the second communication mode, and transmits the signal in the second communication mode. The wireless communication apparatus 30 receives the beam learning signal, and monitors the reception situation for each beam pattern, thereby generating and transmitting response information on the basis of the monitoring result. The wireless communication apparatus 20 discriminates the optimal beam pattern on the basis of the response information responding to the beam learning signal.

In the communication process of the preliminary information, the wireless communication apparatus 20, on the basis of the response information, generates the preliminary information so as not to cause interference among the plurality of wireless communications using the second communication mode, and transmits the information in the first communication mode. Further, the wireless communication apparatus 30, on the basis of the received preliminary information, performs communication of the data signal in the second communication mode.

Figure 4:
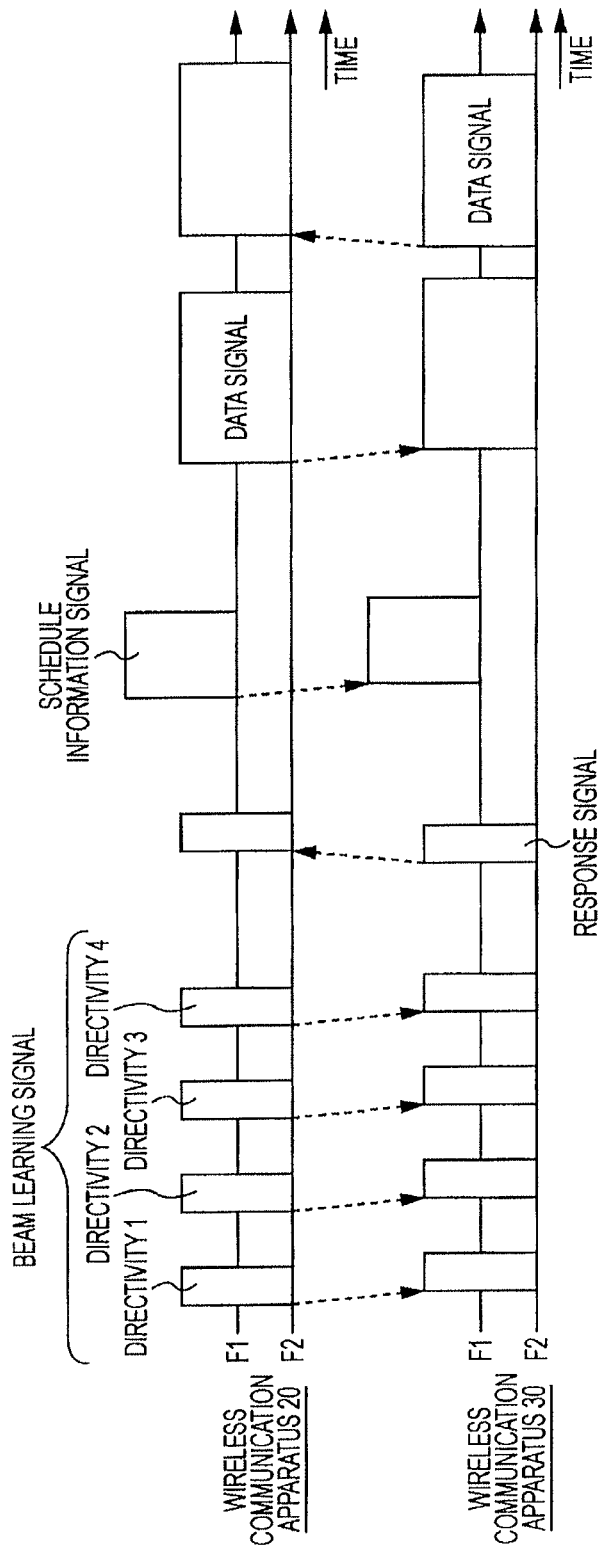
FIG. 4 is a diagram illustrating an example of a communication procedure for the case where communication of response information is performed by using a second communication mode.

FIG. 4 shows an example of a communication procedure for the case where the communication of the response information is performed by using the second communication mode. Furthermore, in FIG. 4, the frequency channel F1 is a frequency channel used in the first communication mode, and the frequency channel F2 has a frequency different from that of the frequency channel F1, and is a frequency channel used in the second communication mode.

The wireless communication apparatus 20 transmits the beam learning signal to the frequency channel F2 in order to monitor the reception situation for each beam pattern of the antenna. In this case, the directivity control section 205 of the wireless communication apparatus 20 sets the number of times of transmission of the beam learning signal or the beam learning signal sequence in accordance with the number of beam patterns.

Figure 5:
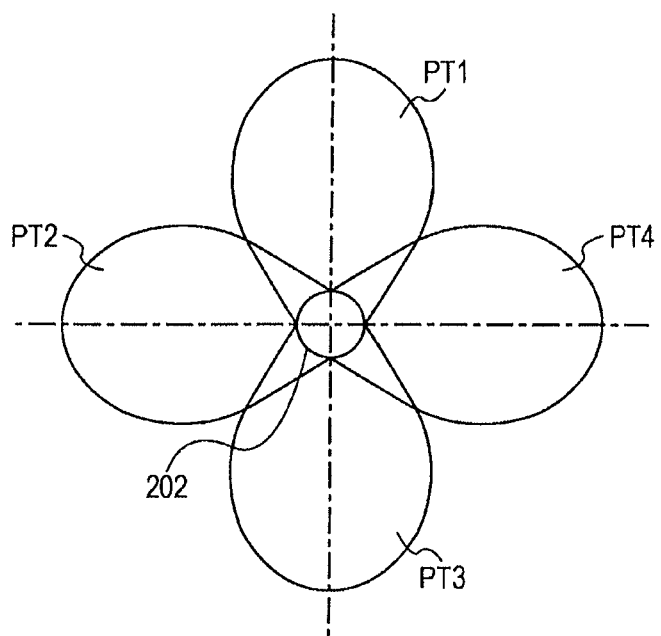
FIG. 5 is a diagram illustrating an example of a beam pattern of an antenna.

FIG. 5 shows an example of the beam pattern of the antenna 202. When the beam pattern of the antenna 202 can be changed into any one of the patterns PT1 (directivity 1) to PT4 (directivity 4), the wireless communication apparatus 20 transmits the beam learning signals in accordance with the respective beam patterns as shown in FIG. 4. That is, the beam learning signals are transmitted four times. Further, the wireless communication apparatus 20 adds the pattern identifier or change the beam learning signal sequence so as to identify which one of the beam patterns is used in the transmission from the beam learning signal.

The wireless communication apparatus 30 receives the beam learning signal, and discriminates the beam learning signal or the beam pattern by which the reception signal is optimized. Then, the wireless communication apparatus 30 generates the response information enabling discrimination as to the beam pattern by which the reception signal is optimized, and transmits the information through the frequency channel F2. Furthermore, the beam pattern of the antenna 302 at this time is set as, for example, a pattern which is obtained when the beam learning signal is received most favorably.

The wireless communication apparatus 20 receives the response information, and discriminates the optimal beam pattern at the time of transmitting the data signal from the antenna 202 to the wireless communication apparatus 30 through the frequency channel F2 on the basis of the received response information.

Further, the wireless communication apparatus 20 generates the preliminary information, and transmits the generated preliminary information from the antenna 201 through the frequency channel F1. Then, the wireless communication apparatus 20 transmits and receives the data signals through the frequency channel 2 in accordance with the generated preliminary information.

The wireless communication apparatus 30 allows the antenna 301 to receive the preliminary information, and transmits and receives the data signals through the frequency channel 2 in accordance with the received preliminary information.

Furthermore, FIG. 4 shows the case where the communication is performed by using two frequency channels, but the communication may be performed by using more frequency channels. In this case, it is preferable that the frequency channel used in the communication of the preliminary information should be set as a channel of which the frequency is lower than that of the frequency channel used in the communication of the data signal.

As described above, when the communication is performed by using two or more frequency channels, it is preferable that the frequency channel used in the communication of the preliminary information should be set as a channel of which the frequency is lower than that of the frequency channel used in the communication of the data signal. That is, it is preferable that the frequency band of the first communication mode should be lower than the frequency band of the second communication mode. In such a manner, it is possible to stably transmit and receive the preliminary information that should be more reliably exchanged.

Figure 6:
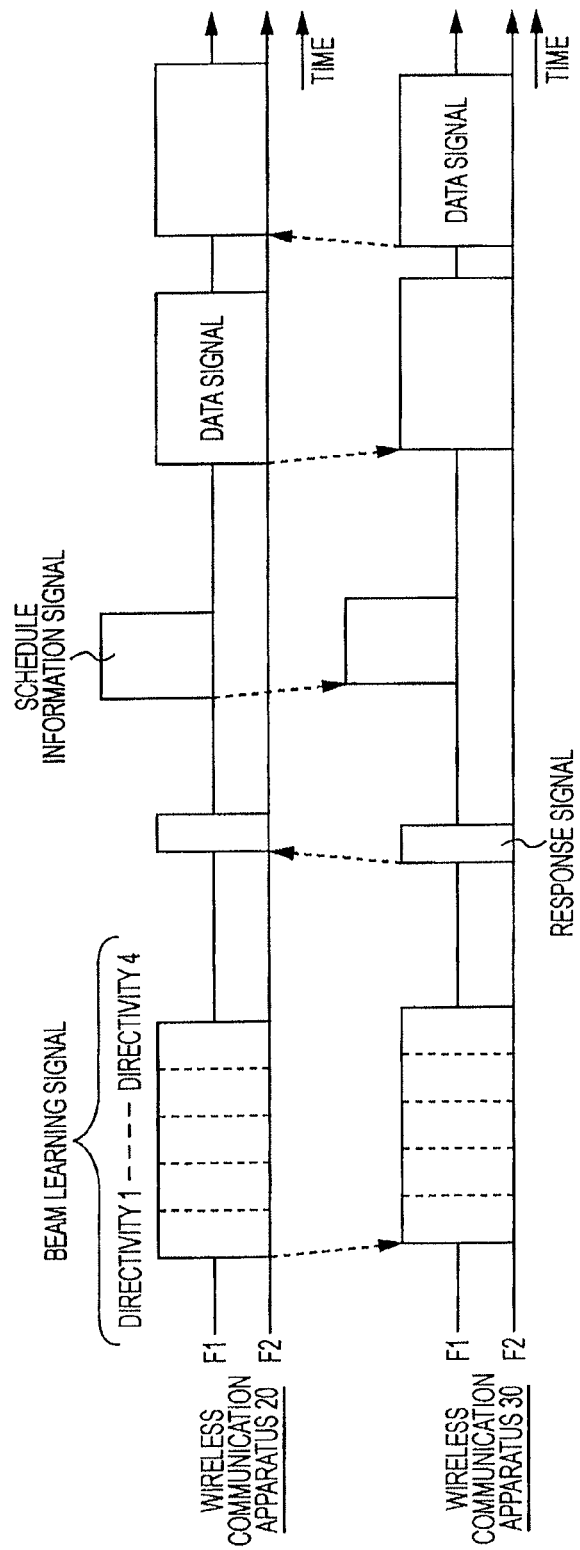
FIG. 6 is a diagram illustrating an example of a communication procedure for the case where a beam learning signal sequence is changed in accordance with the beam pattern.

FIG. 6 shows an example of a communication procedure for the case where the beam learning signal sequence is changed in accordance with the beam pattern in a single beam learning signal at the time of transmitting the beam learning signal through the frequency channel F2. As described above, in the single beam learning signal, the beam learning signal sequence is changed in accordance with the beam pattern, and then it is possible to avoid loss of frame efficiency. Further, owing to the position in the packet at which the reception signal is optimized when the beam learning signal is received, it is possible to perform the identification of the beam pattern.

Figure 7:
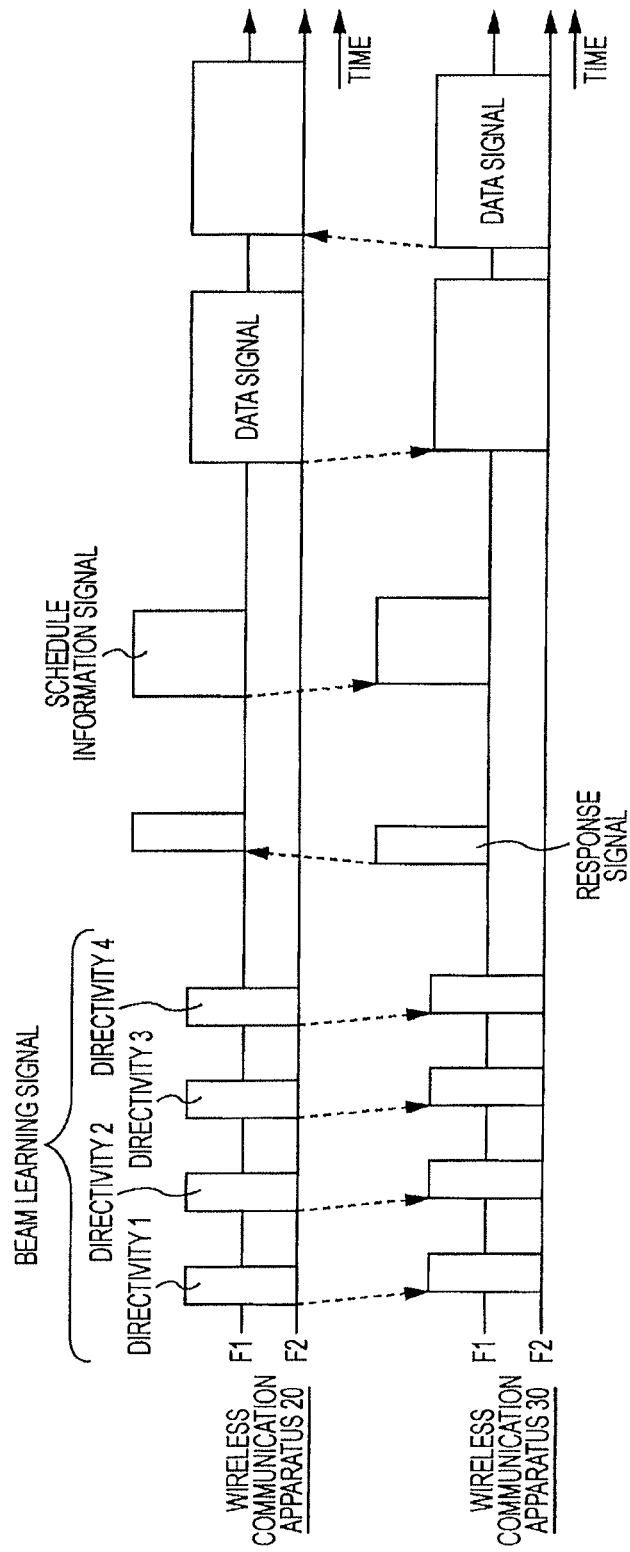
FIG. 7 is a diagram illustrating an example of a communication procedure for the case where communication of response information is performed by using a first communication mode.

FIG. 7 shows an example of a communication procedure for the case where the communication of the response information is performed by using the first communication mode. When the communication is performed by using two or more frequency channels, it is preferable that the frequency channel used in the communication of the response information should be set as a channel of which the frequency is lower than that of the frequency channel used in the communication of the data signal. For example, the frequency channel F1 used in the first communication mode is set as a microwave frequency channel, and the frequency channel F2 used in the second communication mode is set as a millimeter-wave frequency channel. In this case, since straightness of the microwave is not greater than that of the millimeter wave, it is possible to stably transmit and receive the response information that should be more reliably exchanged. Further, the communication is available even if the beam pattern is not set to be optimal similarly to the case where the communication is performed through the frequency channel F2. Accordingly, it is also possible to transmit the response information for each beam learning signal. Further, it is also possible to transmit the response information whenever trainings are terminated a predetermined number of times.

Figure 8:
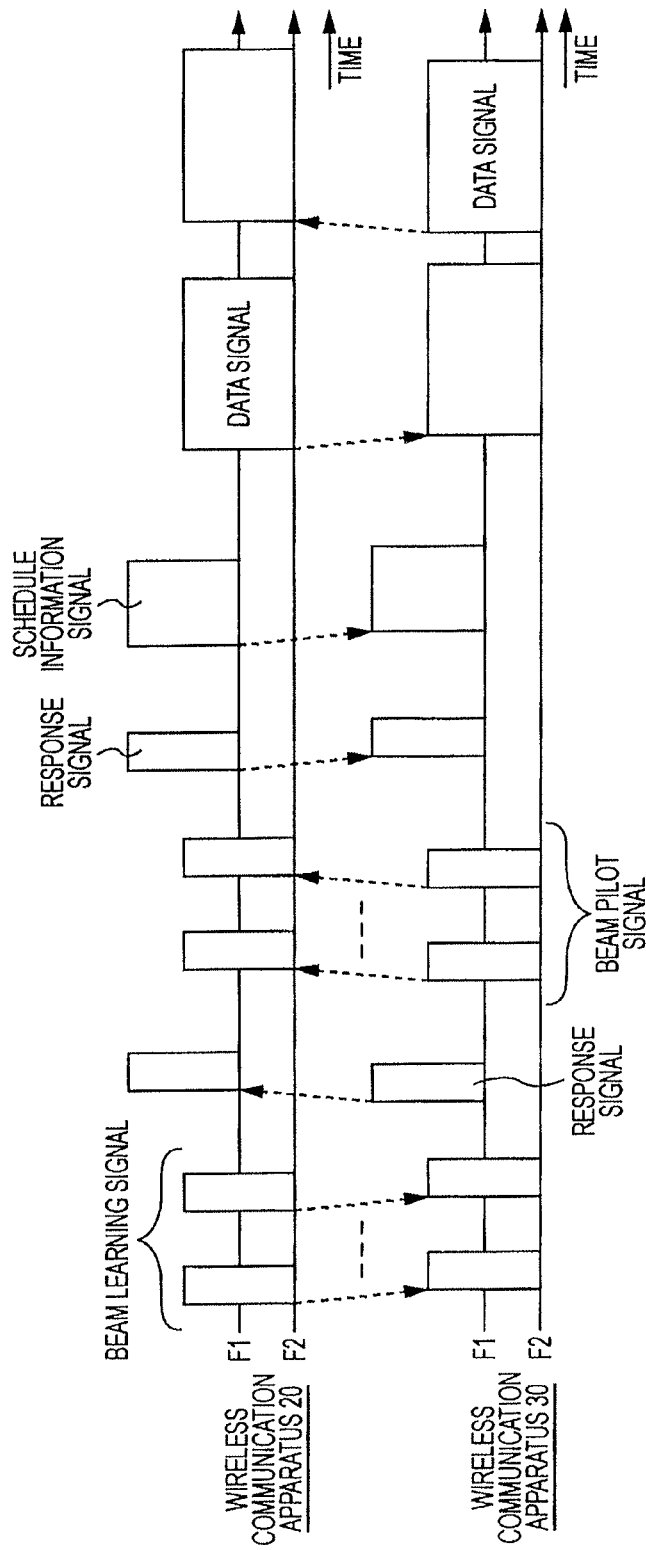
FIG. 8 is a diagram illustrating an example of a communication procedure for the case where the communication of the beam learning signal and the communication of the response information are performed bi-directionally.

FIG. 8 shows a communication procedure for the case where the communication of the beam learning signal and the communication of the response information are performed bi-directionally between the wireless communication apparatus 20 and the wireless communication apparatus 30. In this case, as described above, each of the wireless communication apparatuses 20 and 30 is provided with the beam learning signal generation section, the response information acquisition section, and the response information generation section. In FIGS. 4, 6, and 7, depending on the reception situation of when the beam learning signal transmitted from the wireless communication apparatus 20 is received by the wireless communication apparatus 30, the beam pattern at the time of the transmission in the wireless communication apparatus 20 and the beam pattern at the time of the reception in the wireless communication apparatus 30 are determined. Further, by using the beam pattern, the transmission is performed by the antenna 302 and the reception is performed by the antenna 202. However, it is conceivable that, depending on the communication situation and the like, the optimal beam patterns of the transmission performed by the antenna 302 and the reception performed by the antenna 202 are different from the optimal beam patterns of the reception performed by the antenna 302 and the transmission performed by the antenna 202.

In this case, depending on the reception situation of when the beam learning signal is transmitted from the wireless communication apparatus 30 and the beam learning signal is received by the wireless communication apparatus 20, the beam pattern at the time of the transmission in the wireless communication apparatus 30 and the beam pattern at the time of the reception in the wireless communication apparatus 20 are determined. As described above, when the beam patterns are determined, it is possible to optimize the beam patterns in the respective cases where the data signal is transmitted from the wireless communication apparatus 20 to the wireless communication apparatus 30 and the data signal is transmitted from the wireless communication apparatus 30 to the wireless communication apparatus 20.

Figure 9:
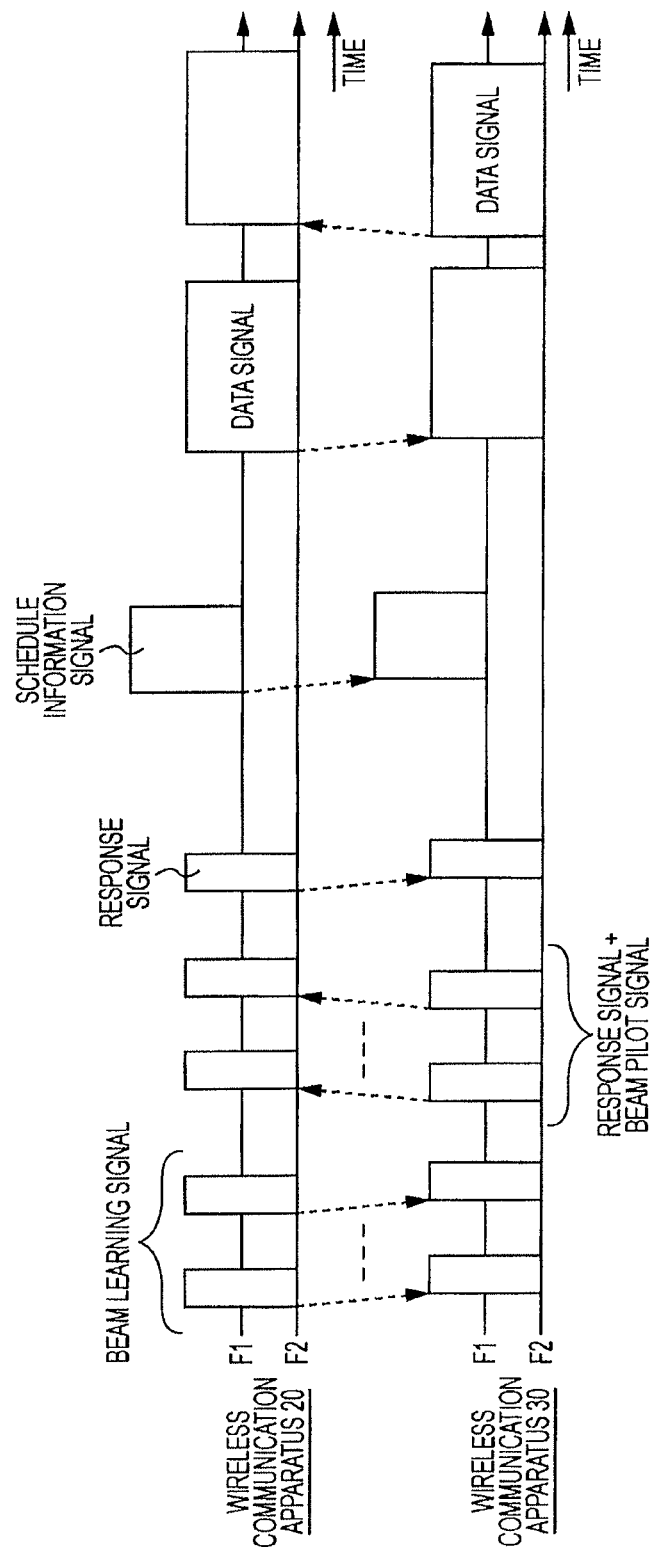
FIG. 9 is a diagram illustrating an example of a communication procedure by which time efficiency can be improved.

FIG. 9 shows an example of a communication procedure capable of improving time efficiency in the case where the communication of the beam learning signal and the communication of the response information are performed bi-directionally. The wireless communication apparatus 30 adds the beam learning signal to the response information and transmits the information when the response information is transmitted.

As described above, when the response information and the beam learning signal are unified, in the training process, it is possible to reduce the number of times of the transmission/reception between the wireless communication apparatus 20 and the wireless communication apparatus 30, and it is possible to improve the time efficiency.

2. Second Embodiment

Figure 10:
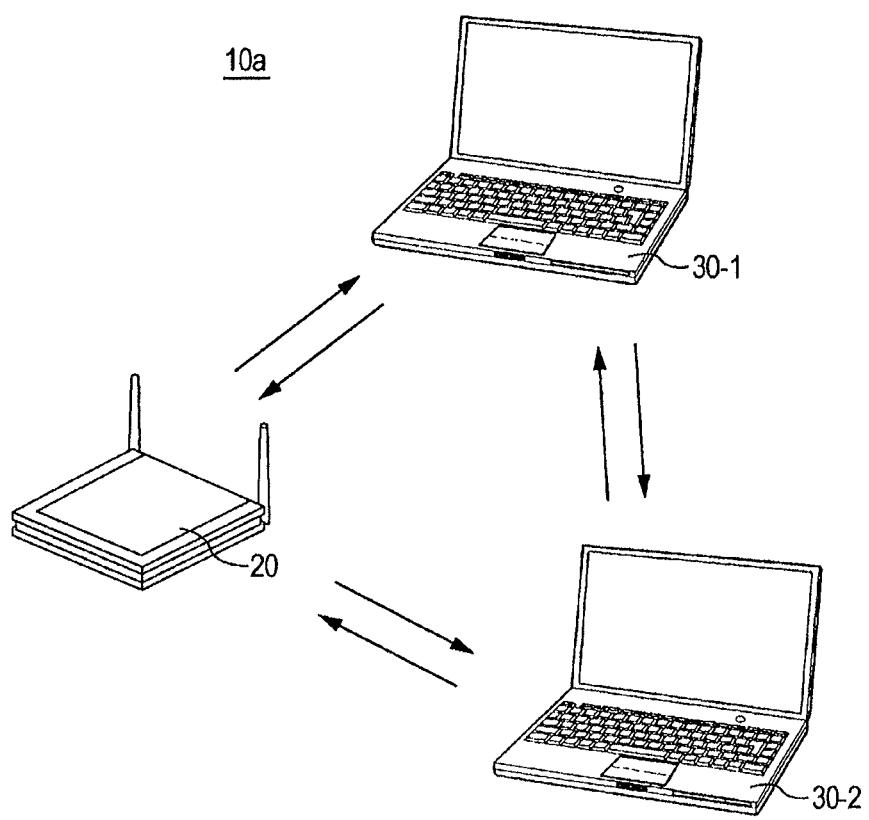
FIG. 10 is a diagram illustrating a case where three wireless communication apparatuses constitute a wireless communication system.

FIG. 10 shows the case where three wireless communication apparatuses constitute a wireless communication system. The wireless communication system 10a includes a wireless communication apparatus 20 and two wireless communication apparatuses 30-1 and 30-2. Further, the wireless communication apparatuses 30-1 and 30-2 are configured to be the same as the wireless communication apparatus 30 shown in FIG. 3.

Here, the wireless communication apparatus 20 is able to communicate with the wireless communication apparatuses 30-1 and 30-2. Further, the wireless communication apparatus 30-1 is able to communicate with the wireless communication apparatuses 20 and 30-2. The wireless communication apparatus 30-2 is able to communicate with the wireless communication apparatuses 20 and 30-1.

In this case, for example, between the wireless communication apparatus 20 and the wireless communication apparatus 30-1, not only the information of the reception situation for each beam pattern between the wireless communication apparatuses 20 and 30-1 but also the information of the reception situation for each beam pattern between the wireless communication apparatuses 30-1 and 30-2 are treated as the response information. As described above, when a configuration is made so as to acquire the response information in communication in which the own wireless communication apparatus is not interposed, it is possible to generate the preliminary information capable of efficiently performing the wireless communication.

Figure 11:
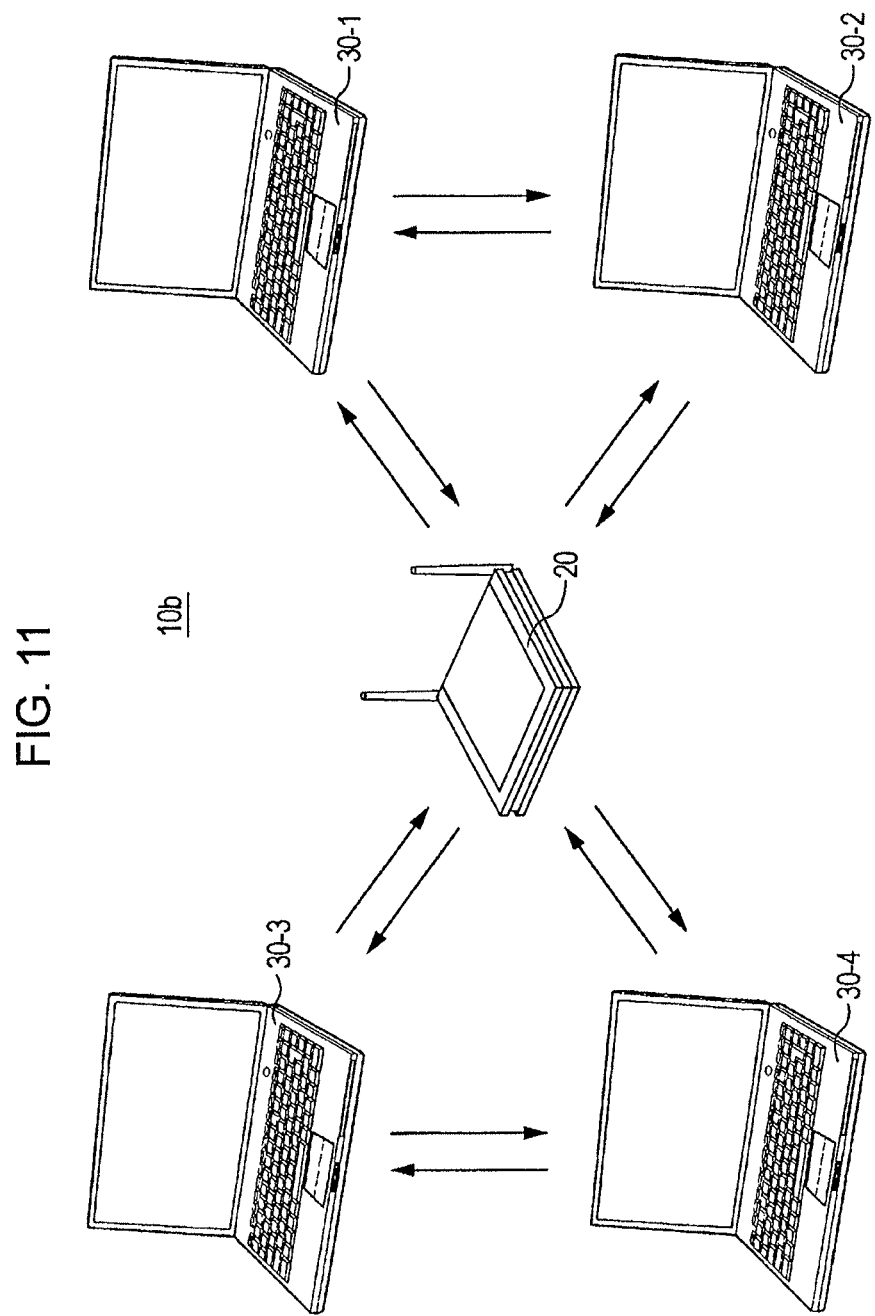
FIG. 11 is a diagram illustrating a case where five wireless communication apparatuses constitute a wireless communication system.

Here, in order to facilitate the efficient wireless communication, for example the case where five wireless communication apparatuses constitute a wireless communication system is described in detail. FIG. 11 shows the case where five wireless communication apparatuses constitute a wireless communication system. The wireless communication system 10b includes a wireless communication apparatus 20 and four wireless communication apparatuses 30-1 to 30-4. Further, the wireless communication apparatuses 30-1 to 30-4 are configured to be the same as the wireless communication apparatus 30 shown in FIG. 3.

The wireless communication apparatus 20 generates a schedule table on the basis of the response information. The schedule table is, for example, a matrix table representing whether or not communication is available between the wireless communication apparatuses.

Here, as shown in FIG. 11, the wireless communication apparatus 20 is able to communicate with, for example, the four wireless communication apparatuses 30-1 to 30-4 by using the frequency channel F2 in the second communication mode. Further, between the wireless communication apparatus 30-1 and the wireless communication apparatus 30-2 and between the wireless communication apparatus 30-3 and the wireless communication apparatus 30-4, communication is available by using the frequency channel F2 in the second communication mode. Then, among the wireless communication apparatus 30-1 and the wireless communication apparatuses 30-3 and 30-4 and among the wireless communication apparatus 30-2 and the wireless communication apparatuses 30-3 and 30-4, the communication is unavailable by using the frequency channel F2 in the second communication mode.

The wireless communication apparatus 20 is able to acquire the response information of the communication in which the own wireless communication apparatus is not interposed. That is, the wireless communication apparatuses 30-1 to 30-4 transmits the response information, which is generated by the response information generation section, including the information representing the available wireless communication apparatus. For example, the response information, which is provided from the wireless communication apparatus 30-1 to the wireless communication apparatus 20, includes the response information which is provided from the wireless communication apparatuses 30-2, 30-3, and 30-4 to the wireless communication apparatus 30-1. Further, the response information, which is provided from the wireless communication apparatuses 30-2, 30-3, and 30-4 to the wireless communication apparatus 20, includes the response information of the communication in which the wireless communication apparatus 20 is not interposed. Further, the response information is not limited to this, and may include the identification information uniquely allocated to the available wireless communication apparatus.

As described above, the wireless communication apparatus 20 is able to detect a communication path in which the own wireless communication apparatus is not interposed on the basis of the response information from the wireless communication apparatuses 30-1 to 30-4. Accordingly, on the basis of the response information of the wireless communication apparatus 20, the schedule table shown in FIG. 12 can be generated. Furthermore, in FIG. 12, the reference sign O represents that the communication is available, and the reference sign X represents that the communication is unavailable.

The wireless communication apparatus 20 generates the preliminary information representing the communication schedule and the like set so as not to cause interference by using the generated schedule table, and transmits the generated preliminary information to the wireless communication apparatus. For example, the wireless communication apparatus 30-1 is able to communicate with only the wireless communication apparatus 20 and the wireless communication apparatus 30-2, and the wireless communication apparatus 30-2 is able to communicate with only the wireless communication apparatus 20 and the wireless communication apparatus 30-1. On the other hand, the wireless communication apparatus 30-3 is able to communicate with only the wireless communication apparatus 20 and the wireless communication apparatus 30-4, and the wireless communication apparatus 30-4 is able to communicate with only the wireless communication apparatus 20 and the wireless communication apparatus 30-3. That is, the communication between the wireless communication apparatus 30-1 and the wireless communication apparatus 30-2 does not interfere with the communication between the wireless communication apparatus 30-3 and the wireless communication apparatus 30-4. Accordingly, the wireless communication apparatus 20 is able to determine the communication schedule so as to concurrently perform the communication between the wireless communication apparatus 30-1 and the wireless communication apparatus 30-2 and the communication between the wireless communication apparatus 30-3 and the wireless communication apparatus 30-4 at the same time.

Figure 13:
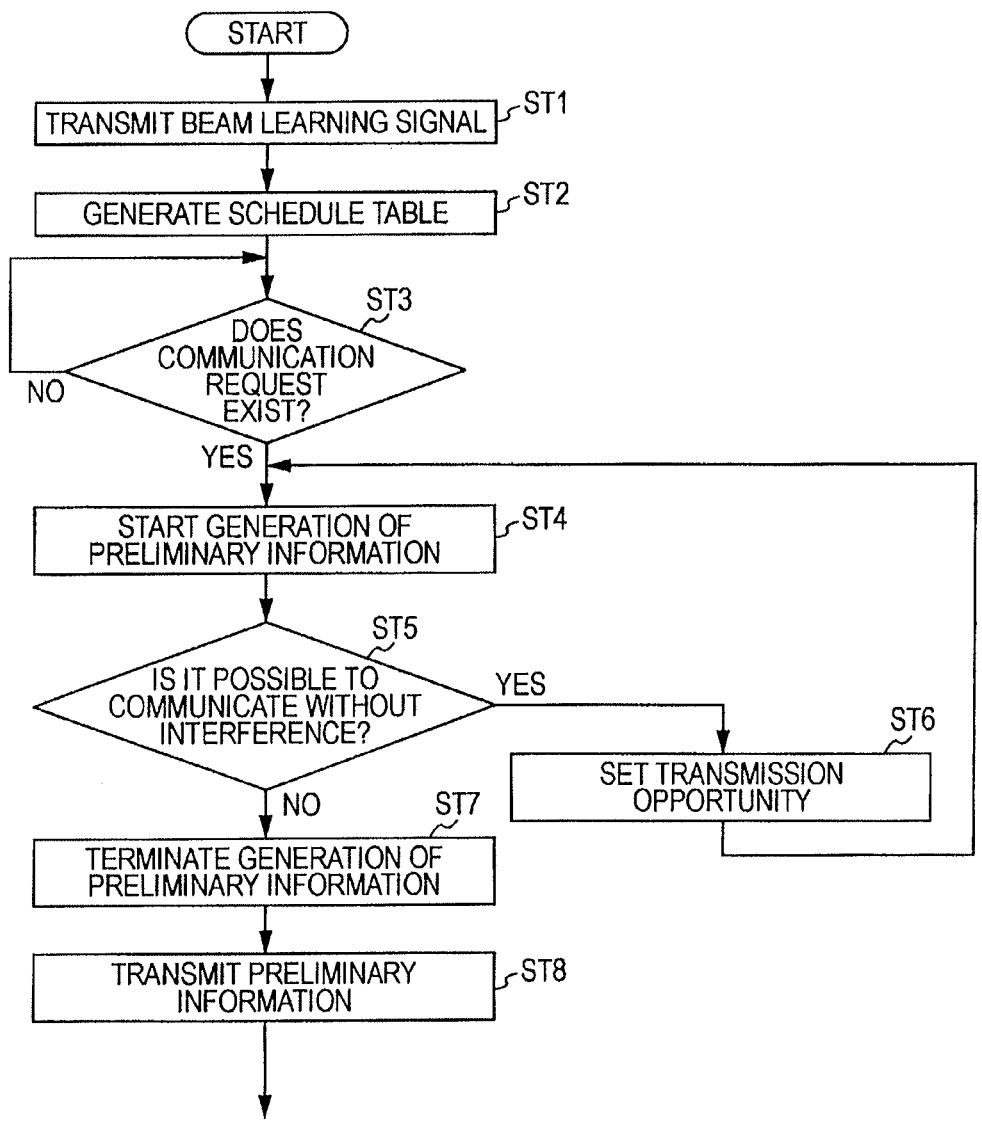
FIG. 13 is a flowchart illustrating an example of a transmission process of preliminary information.

FIG. 13 is a flowchart illustrating an example of the transmission process of the preliminary information. In step ST1, the wireless communication apparatus 20 transmits the beam learning signal. The wireless communication apparatus 20 transmits the beam learning signal by using the frequency channel F2, and the flow advances to step ST2.

In step ST2, the wireless communication apparatus 20 generates the schedule table. The wireless communication apparatus 20 receives the response information which is provided from another wireless communication apparatus in response to the transmission of the beam learning signal. Further, the wireless communication apparatus 20 generates the schedule table on the basis of the received response information, and the flow advances to step ST3.

In step ST3, the wireless communication apparatus 20 determines whether or not the communication request exists. In the wireless communication apparatus 20, if there is no communication request, the flow returns to step ST3, and if there is the communication request, the flow advances to step ST4.

In step ST4, the wireless communication apparatus 20 starts generating the preliminary information, and the flow advances to step ST5.

In step ST5, the wireless communication apparatus 20 determines whether or not the communication is available without causing interference. If the wireless communication apparatus 20 determines that the communication is available without causing interference with another communication during the communication for the request on the basis of the schedule table, the flow advances to step ST6. In contrast, if it is determined that the communication is unavailable without causing interference with another communication, the flow advances to step ST7.

In step ST6, the wireless communication apparatus 20 configures the setting for transmission opportunity. When it is possible to perform communication without causing interference with another communication, the wireless communication apparatus 20 generates the preliminary information on the communication corresponding to the request, and the flow returns to step ST4.

In step ST7, the wireless communication apparatus 20 terminates the generation of the preliminary information, and the flow advances to step ST8. The wireless communication apparatus 20 performs the processes of steps ST5 and ST6, and thus is able to set the communication schedule for the plurality of communications performed without interference. Further, the setting of the communication schedule for the plurality of communication performed without interference is completed, and then the flow advances from steps ST5 to ST7, and the generation of the preliminary information is terminated.

In step ST8, the wireless communication apparatus 20 transmits the preliminary information. The wireless communication apparatus 20 transmits the preliminary information, which is generated by the processes of steps ST4 to ST7, to another wireless communication apparatus.

As described above, when the process shown in FIG. 13 is performed, the wireless communication apparatuses perform communication on the basis of the preliminary information. In such a manner, it is possible to multiply perform the plurality of communications with the same frequency channel and at the same time without causing interference with another communication.

Figure 12:
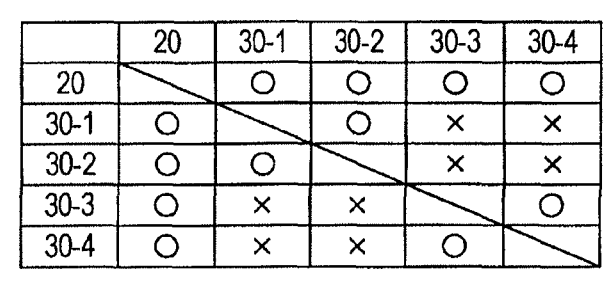
Figure 14:
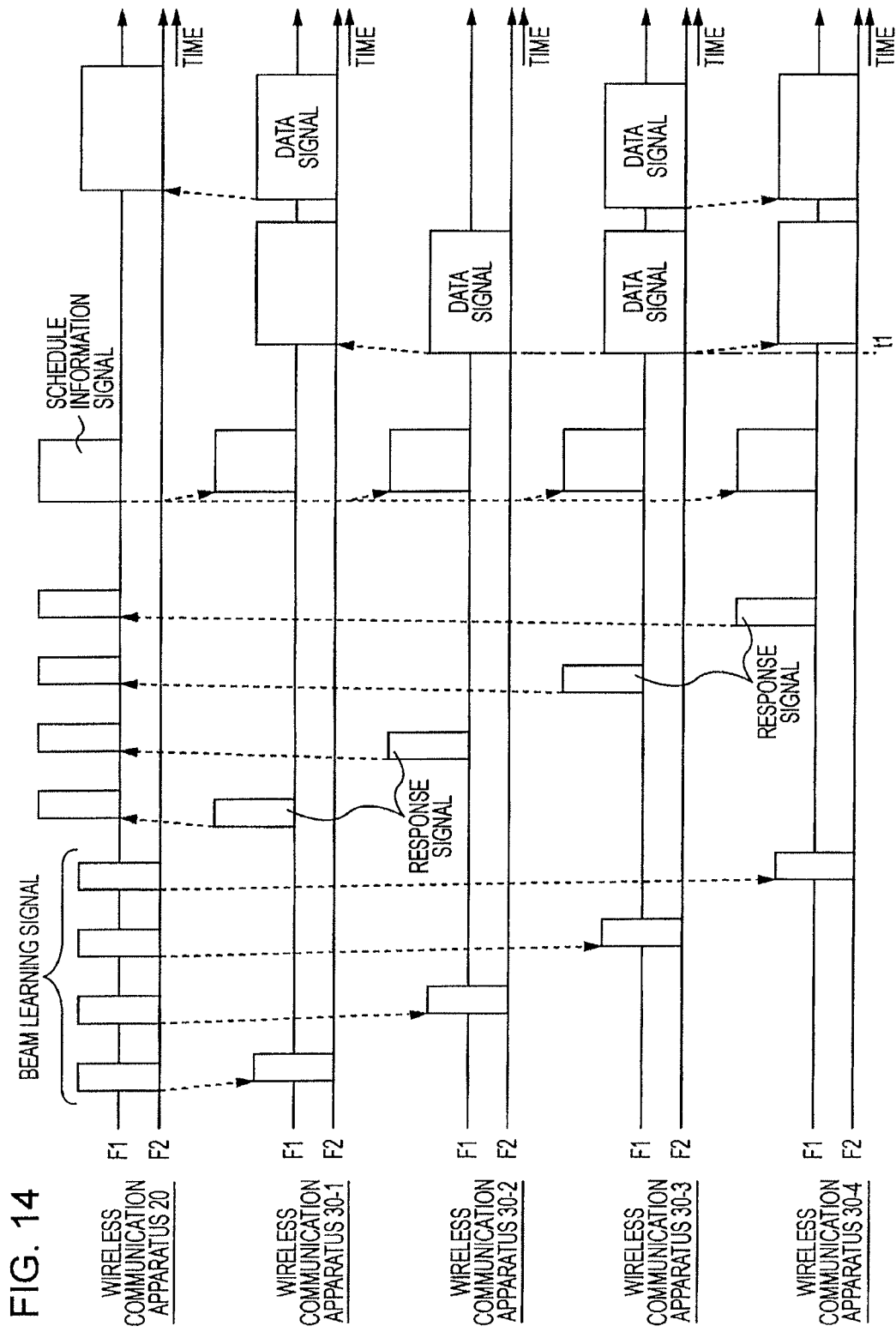
FIG. 14 is a diagram illustrating an example of a communication procedure (first) for the case where communication is performed on the basis of the preliminary information.
Figure 15:
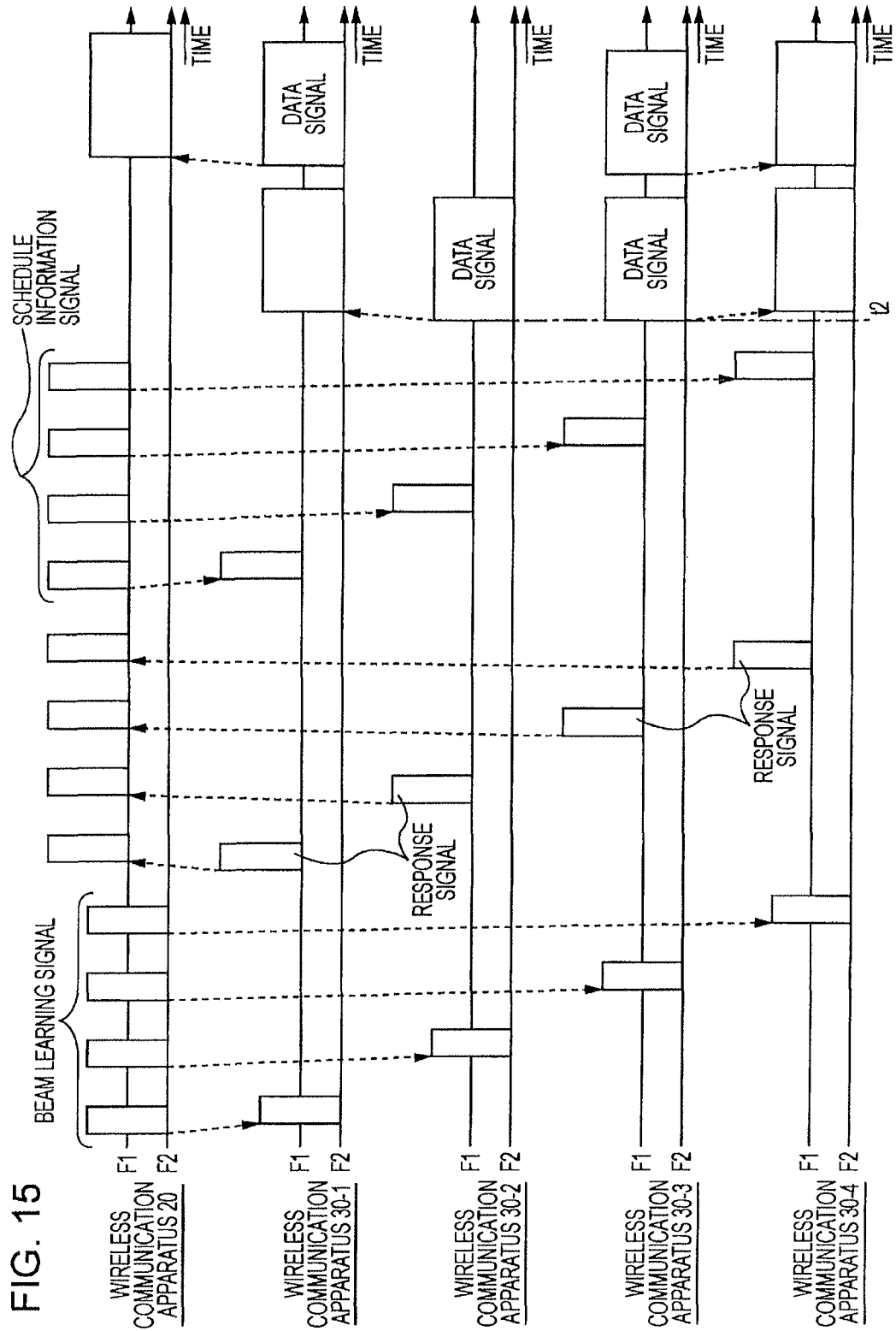
FIG. 15 is a diagram illustrating an example of a communication procedure (second) for the case where communication is performed on the basis of the preliminary information.

FIGS. 14 and 15 show examples of communication procedures for the case where communication is performed on the basis of the preliminary information which is created by using the schedule table of FIG. 12. When the preliminary information created by the wireless communication apparatus 20 is notified to another wireless communication apparatus, the apparatus stably transmits and receives the preliminary information that should be more reliably exchanged. Then, the apparatus transmits the preliminary information through the frequency channel F1 lower than the frequency channel F2 through which the communication of the data signal is performed.

The preliminary information may include the scheduled transmission/reception timing of the apparatus. Further, the preliminary information may include the transmitted power of the scheduled transmission of the apparatus, the modulation mode of the scheduled transmission of the apparatus, and the encoding mode of the scheduled transmission of the apparatus. In addition, the preliminary information may include the antenna beam pattern used in the scheduled transmission/reception of the apparatus.

Furthermore, FIG. 14 shows the case where the preliminary information is transmitted from the wireless communication apparatus 20 in a broadcast manner. Further, FIG. 15 shows the case where the preliminary information is transmitted from the wireless communication apparatus 20 to every wireless communication apparatus in a unicast manner.

FIGS. 14 and 15, for example at the time point t1, communication from the wireless communication apparatus 30-2 to the wireless communication apparatus 30-1 and the communication from the wireless communication apparatus 30-3 to the wireless communication apparatus 30-4 are performed through the same frequency channel. The reason why the same frequency channel is allocated is that it is figured out that interference does not occur between the two rather than the prior schedule table. Further, at the time point t2, by setting the appropriate beam pattern of the antenna, it is also possible to perform the communication at the same time and with the same frequency without interference.

In addition, in FIGS. 14 and 15, the timings between the apparatuses at the time points t1 and t2 are synchronized. Thus, it is figured out that the wireless communications are performed at the same time. However, it may be also possible to schedule the communications asynchronously if interference does not occur.

Furthermore, the wireless communication apparatuses 20 and 30 may be a wireless communication module provided in a computer device, a portable cellular phone, a portable information terminal such as PDA (Personal Digital Assistant), a portable music player, information equipment such as a game machine, a television receiver, or other information household appliances.

Figure 16:
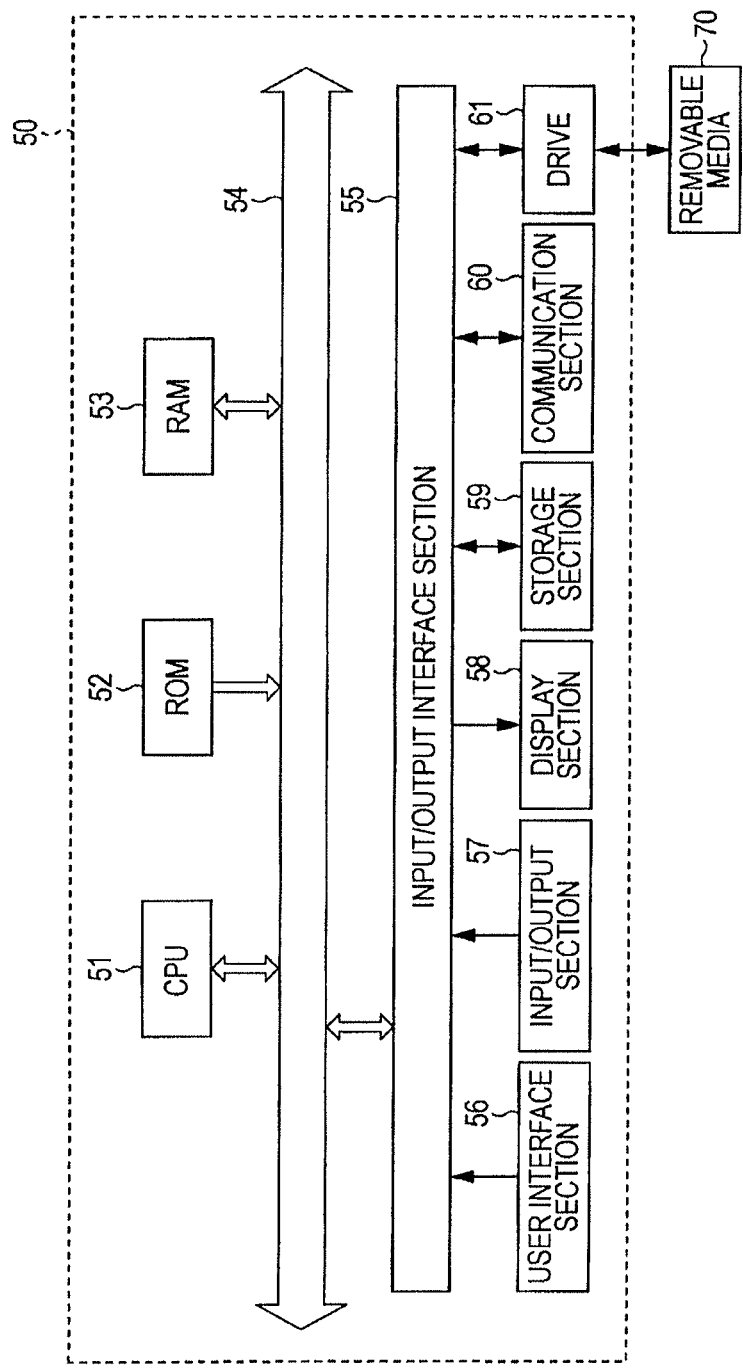
FIG. 16 is a diagram illustrating an exemplary configuration of information equipment.

FIG. 16 shows an exemplary configuration of the information equipment 50 equipped with the modularized wireless communication apparatuses 20 and 30.

A CPU (Central Processing Unit) 51 executes a program stored in a ROM (Read Only Memory) 52 or a storage section 59 under the program execution environment provided by an operating system (OS). For example, it is possible to realize a process of synchronizing the received packets or a part of the process by allowing the CPU 51 to execute a predetermined program.

The ROM 52 permanently stores program codes such as the POST (Power On Self Test) and the BIOS (Basic Input Output System). The RAM (Random Access Memory) 53 is used to load a program stored in the ROM 52 or the storage section 59 when the CPU 51 is intended to execute the program, or to temporarily retain work data of a program in the process of execution. Those are connected to each other through a local bus 54 directly connected to a local pin of the CPU 51.

The local bus 54 is connected to an input/output interface section 55. The input/output interface section 55 is connected with a user interface section 56, an input/output section 57, a display section 58, the storage section 59, a communication section 60, and a drive 61.

The user interface section 56 includes pointing devices such as a keyboard and a mouse, and generates an operation signal based on the user's operation. The input/output section 57 is an interface for inputting and outputting various kinds of data from and to external devices. The display section 58 includes a LCD (Liquid Crystal Display) or a CRT (Cathode Ray Tube), and displays various information as texts and images. The storage section 59 includes a HDD (Hard Disk Drive) and the like. The storage section 59 is used to install programs such as an operating system and various applications executed by the CPU 51 or retain data files.

The communication section 60 is a wireless communication interface constituted by modularizing the wireless communication apparatuses 20 and 30. The communication section 60 is operated as an access point or a terminal under the infrastructure mode, or is operated as a terminal under the ad-hoc mode, and performs the wireless communication with other terminals existing in the communication range.

The drive 61 is for reading out various kinds of data, computer programs, and the like stored in an equipped removable medium 70 such as a magnetic disc, an optical disc, an optical magnetic disc, or a semiconductor memory.

According to the embodiments of the invention, the wireless communication is performed by using the first communication mode and the second communication mode using a different frequency band from the first communication mode, and the beam learning signal for specifying the beam pattern at the time of performing the communication based on the second communication mode is transmitted in the second communication mode. On the basis of the response information responding to the transmitted beam learning signal, the plurality of wireless communications using the second communication mode generate the preliminary information so as not to cause interference, and the preliminary information is transmitted to the first wireless communication section. Further, in the wireless communication apparatus receiving the beam learning signal transmitted in the second communication mode, the reception situation is monitored for each beam pattern, and the response information is generated and transmitted on the basis of the monitoring result of the reception situation. Hence, by setting the beam pattern to be optimal on the basis of the beam learning signal and the response information, it is possible to perform communication in the second communication mode.

Further, on the basis of the response information, the plurality of wireless communications using the second communication mode generate the preliminary information so as not to cause interference, and the preliminary information is transmitted in the first communication mode using the different frequency band from the second communication mode. Hence, when the plurality of wireless communications are performed in the second communication mode on the basis of the preliminary information, it is possible to perform efficient wireless communication without causing interference.

In addition, the wireless communication is performed by setting the frequency band of the first communication mode to be lower than the frequency band of the second communication mode. Thus, it is possible to stably transmit and receive the preliminary information that should be exchanged more reliably. For example, the millimeter wave may be used in the second communication mode so as to transmit a large volume of information. In this case, since the millimeter wave is excellent in straightness, it is difficult to perform communication stably unless the directivity of the beam is precisely set in the direction of the communication target location. In contrast, a wave having a lower frequency than the second communication mode, for example, the microwave may be used in the first communication mode. In this case, since the microwave is disadvantageous in straightness as compared with the millimeter wave, it is possible to perform communication stably although the directivity of the beam is not precisely set in the direction of the communication target location. Accordingly, when the preliminary information is transmitted in the first communication mode by setting the frequency band of the first communication mode to be lower than the frequency band of the second communication mode, it is possible to increase reliability of the communication of the preliminary information that should be exchanged more reliably.

The present application contains subject matter related to that disclosed in Japanese Priority Patent Application JP 2009-106214 filed in the Japan Patent Office on Apr. 24, 2009, the entire content of which is hereby incorporated by reference.

The above described embodiments should not be interpreted as limiting the scope of the invention. Since the above described embodiments are set forth by way of example, it will be readily apparent to those skilled in the art that obvious modifications, derivations and variations can be made to the embodiments without departing from the scope of the invention. Consequently, in order to understand the scope of the invention, the claims appended hereto should be considered.

What is claimed is:

1. A wireless communication apparatus comprising:
a first wireless communication section performing wireless communication on the basis of a first communication mode;
a second wireless communication section performing wireless communication on the basis of a second communication mode using a different frequency band from the first communication mode;
a learning signal generation section generating a learning signal for specifying a pattern at the time of the communication based on the second communication mode and transmitting the learning signal from the second wireless communication section;
a response information acquisition section acquiring response information responding to the transmitted learning signal; and
a preliminary information generation section generating preliminary information using the second communication mode on the basis of the response information and transmitting the preliminary information from the first wireless communication section.

2. The wireless communication apparatus according to claim 1, wherein the preliminary information generation section includes a communication schedule, which is set not to cause interference in the preliminary information.

3. The wireless communication apparatus according to claim 2, wherein the preliminary information generation section includes a communication schedule, which is set to perform the plurality of wireless communications simultaneously without causing interference in the preliminary information.

4. The wireless communication apparatus according to claim 2,
wherein the learning signal enables identification as to which pattern is used in the transmission thereof, and
wherein the second wireless communication section transmits the learning signal with the pattern based on the learning signal in the second communication mode.

5. The wireless communication apparatus according to claim 2, wherein the first wireless communication section simultaneously or separately transmits the preliminary information to a plurality of wireless communications apparatuses.

6. The wireless communication apparatus according to claim 1, wherein a frequency band of the first communication mode is lower than that of the second communication mode.

7. The wireless communication apparatus according to claim 1, wherein the preliminary information generation section does not alleviate interference among a plurality of wireless communications.

8. A wireless communication apparatus comprising:
circuitry configured to perform wireless communication on the basis of a first communication mode;
perform wireless communication on the basis of a second communication mode using a different frequency band from the first communication mode;
generate a learning signal for specifying a pattern at the time of the communication based on the second communication mode and transmitting the learning signal;
acquire response information responding to the transmitted learning signal; and
generate preliminary information using the second communication mode on the basis of the response information and transmitting the preliminary information.

9. The wireless communication apparatus according to claim 1, wherein the circuitry includes a communication schedule, which is set not to cause interference in the preliminary information.

10. The wireless communication apparatus according to claim 2, wherein the circuitry includes a communication schedule, which is set to perform the plurality of wireless communications simultaneously without causing interference in the preliminary information.

11. The wireless communication apparatus according to claim 2,
wherein the learning signal enables identification as to which pattern is used in the transmission thereof, and
wherein the circuitry transmits the beam learning signal with the pattern based on the learning signal in the second communication mode.

12. The wireless communication apparatus according to claim 2, wherein the circuitry simultaneously or separately transmits the preliminary information to a plurality of wireless communications apparatuses.

13. The wireless communication apparatus according to claim 1, wherein a frequency band of the first communication mode is lower than that of the second communication mode.

14. A wireless communication method comprising the steps of:
performing wireless communication on the basis of a first communication mode, by using a first wireless communication section;
performing wireless communication on the basis of a second communication mode using a different frequency band from the first communication mode, by using a second wireless communication section;
generating a learning signal for specifying a pattern at the time of the communication based on the second communication mode and transmitting the learning signal from the second wireless communication section, by using a learning signal generation section;
acquiring response information responding to the transmitted learning signal, by using a response information acquisition section; and
generating preliminary information using the second communication mode on the basis of the response information and transmitting the preliminary information from the first wireless communication section, by using a preliminary information generation section.

* * * * *